US012574567B2

(12) United States Patent
Liu

(10) Patent No.: US 12,574,567 B2
(45) Date of Patent: Mar. 10, 2026

(54) VIDEO PROCESSING METHOD AND APPARATUS, DEVICE, AND MEDIUM

(71) Applicant: Beijing Zitiao Network Technology Co., Ltd., Beijing (CN)

(72) Inventor: Ang Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 63 days.

(21) Appl. No.: 18/689,820

(22) PCT Filed: Aug. 26, 2022

(86) PCT No.: PCT/CN2022/115060
§ 371 (c)(1),
(2) Date: Mar. 6, 2024

(87) PCT Pub. No.: WO2023/035973
PCT Pub. Date: Mar. 16, 2023

(65) Prior Publication Data
US 2024/0422365 A1      Dec. 19, 2024

(30) Foreign Application Priority Data
Sep. 10, 2021    (CN) ......................... 202111062466.0

(51) Int. Cl.
*H04N 19/98*        (2014.01)
*H04N 1/60*         (2006.01)
*H04N 5/265*        (2006.01)

(52) U.S. Cl.
CPC ........... *H04N 19/98* (2014.11); *H04N 1/6002* (2013.01); *H04N 5/265* (2013.01)

(58) Field of Classification Search
CPC ...... H04N 19/98; H04N 1/6002; H04N 5/265; H04N 5/262
See application file for complete search history.

(56) References Cited

U.S. PATENT DOCUMENTS 10,671,934 B1      6/2020  Ninh et al.
2011/0063681 A1*   3/2011  Onishi ................. H04N 1/3877
                                                    358/1.18
(Continued)

FOREIGN PATENT DOCUMENTS

CN        102567959 A      7/2012
CN        107277616 A      10/2017
(Continued)

OTHER PUBLICATIONS

China Patent Application No. 202111062466.0; Office Action; dated Feb. 10, 2025; 13 pages.
(Continued)

*Primary Examiner* — Tracy Y. Li
(74) *Attorney, Agent, or Firm* — BakerHostetler

(57) ABSTRACT
A video processing method and apparatus, a device and a medium are provided. The video processing method includes: decoding a non-linear video to acquire a corresponding non-linear video frame; processing the non-linear video frame to generate a corresponding linear video frame; acquiring a target linear effect resource having a color space consistent with a color space adopted by the linear video frame; and fusing the linear video frame and the target linear effect resource to generate a linear effect video frame. The color accuracy of the generated linear effect video frame is ensured, the added effect resource is more natural and the realism of the generated linear effect video frame is improved.

18 Claims, 6 Drawing Sheets

(56) References Cited

U.S. PATENT DOCUMENTS

| | | | |
|---|---|---|---|
| 2016/0360215 A1 * | 12/2016 | Rusanovskyy | H04N 19/186 |
| 2018/0007374 A1 * | 1/2018 | Atkins | H04N 19/85 |
| 2018/0176439 A1 * | 6/2018 | Thumpudi | H04N 23/45 |
| 2020/0267277 A1 * | 8/2020 | Gondek | H04N 1/60 |
| 2021/0006802 A1 * | 1/2021 | Zhao | H04N 19/124 |
| 2021/0090608 A1 | 3/2021 | Zhang et al. | |

FOREIGN PATENT DOCUMENTS

| | | | | |
|---|---|---|---|---|
| CN | 108632540 A | | 10/2018 | |
| CN | 109600605 A | | 4/2019 | |
| CN | 110049371 A | | 7/2019 | |
| CN | 105744277 B | * | 12/2019 | H04N 19/124 |
| CN | 111031393 A | | 4/2020 | |
| CN | 111726478 A | | 9/2020 | |
| CN | 112153472 A | | 12/2020 | |
| WO | WO 2021/082299 A1 | | 5/2021 | |

OTHER PUBLICATIONS

International Patent Application No. PCT/CN2022/115060; Int'l Written Opinion and Search Report; dated Nov. 17, 2022; 6 pages.

* cited by examiner

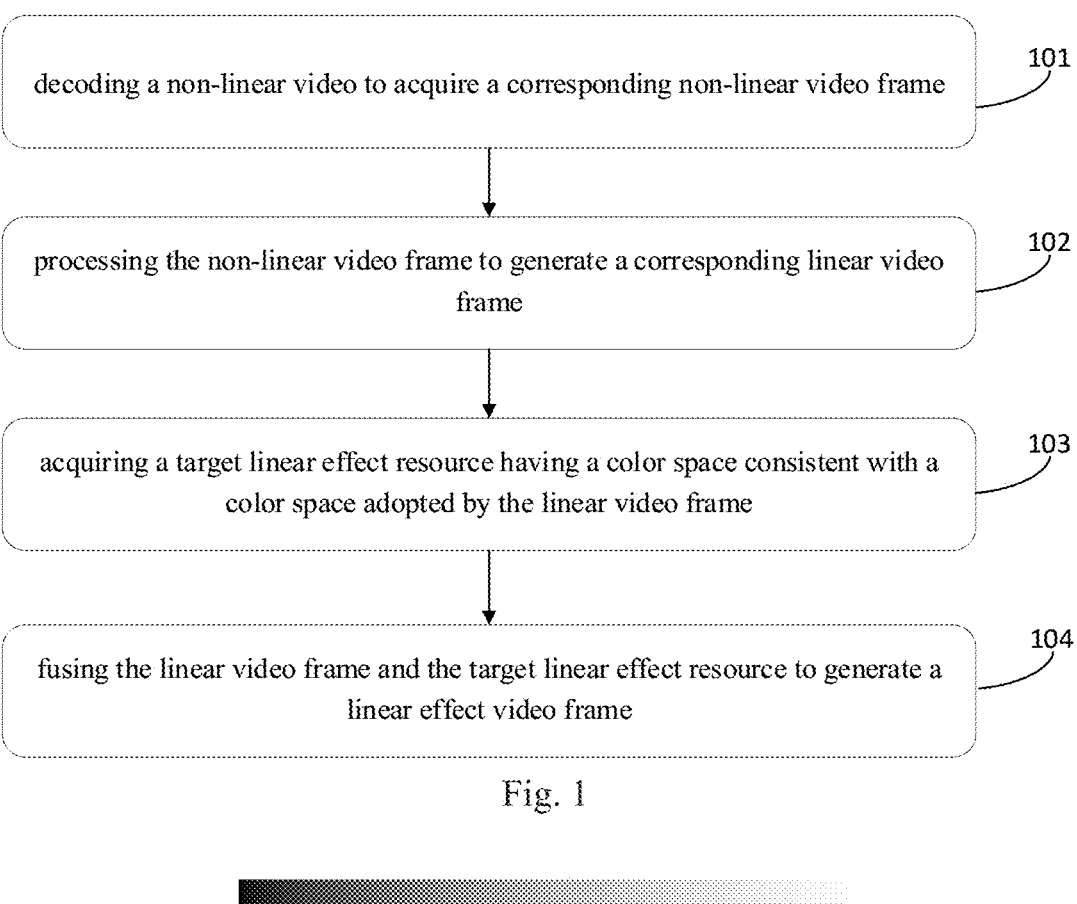

decoding a non-linear video to acquire a corresponding non-linear video frame    101 processing the non-linear video frame to generate a corresponding linear video frame    102 acquiring a target linear effect resource having a color space consistent with a color space adopted by the linear video frame    103 fusing the linear video frame and the target linear effect resource to generate a linear effect video frame    104

Fig. 1

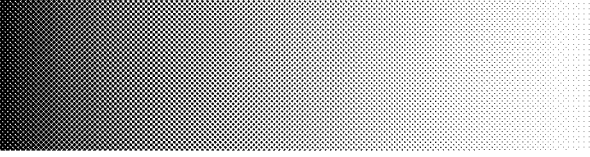

Fig. 2a

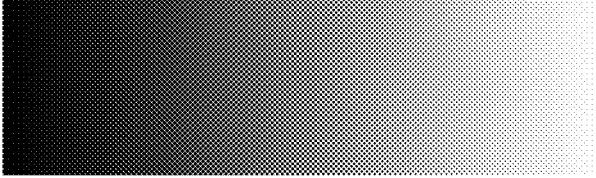

Fig. 2b target linear
effect
resource target
region linear video
frame linear effect
video frame

600 video effect processing apparatus

601 decoding module

603 acquisition module

602 first processing module

604 fusion module

700

701 processing apparatus

702 ROM

703 RAM

704

705

I/O interface 706 input apparatus 707 output apparatus 708 storage apparatus 709 communication apparatus

VIDEO PROCESSING METHOD AND APPARATUS, DEVICE, AND MEDIUM

CROSS-REFERENCE TO RELATED APPLICATION

This application is the U.S. National Stage of International Application No. PCT/CN2022/115060, filed on Aug. 26, 2022, which claims the priority of Chinese patent application No. 202111062466.0, entitled "video processing method and apparatus, device, and medium" filed on Sep. 10, 2021, which are incorporated herein by reference in their entireties.

TECHNICAL FIELD

The present disclosure relates to the technical field of data processing, and in particular to a video processing method, an apparatus, a device, and a medium.

BACKGROUND

With the development of computer technology, the application scenes of video processing technology are more and more extensive, including adding virtual stickers to a video to be processed, making virtual try-on and other application scenes.

However, current video processing methods will cause deviation between a color of the video to be processed and a color of an added virtual effect, resulting in insufficient color accuracy of the generated effect video.

SUMMARY

In order to solve the above technical problems or at least partially solve the above technical problems, the present disclosure provides a video processing method, an apparatus, a device, and a medium.

In a first aspect, embodiments of the present disclosure provide a video processing method, the method includes:

decoding a non-linear video to acquire a corresponding non-linear video frame;

processing the non-linear video frame to generate a corresponding linear video frame;

acquiring a target linear effect resource having a color space consistent with a color space adopted by the linear video frame; and fusing the linear video frame and the target linear effect resource to generate a linear effect video frame.

In a possible implementation, the decoding the non-linear video to acquire the corresponding non-linear video frame includes:

decoding a non-linear high dynamic range imaging (HDR) video to acquire a corresponding non-linear HDR video frame;

or, decoding a non-linear standard dynamic range (SDR) video to acquire a corresponding non-linear SDR video frame.

In a possible implementation, the processing the non-linear video frame to generate the corresponding linear video frame includes:

acquiring a video format of the non-linear video frame; and invoking a conversion function corresponding to the video format to convert the non-linear video frame to generate the corresponding linear video frame.

In a possible implementation, the acquiring the target linear effect resource having the color space consistent with the color space adopted by the linear video frame includes:

detecting whether a color space of a non-linear effect resource is consistent with the color space adopted by the linear video frame; and in response to consistency, processing the non-linear effect resource to generate the corresponding target linear effect resource.

In a possible implementation, the method further including:

in response to inconsistency, processing the non-linear effect resource to generate a corresponding initial linear effect resource; and converting the initial linear effect resource into the target linear effect resource having the color space consistent with the color space adopted by the linear video frame according to a preset color space conversion function.

In a possible implementation, the fusing the linear video frame and the target linear effect resource to generate the linear effect video frame includes at least one of:

overlaying the target linear effect resource with a target region of the linear video frame to generate the linear effect video frame;

calculating the target linear effect resource and pixels of the target region of the linear video frame to generate the linear effect video frame.

In a possible implementation, after generating the linear effect video frame, the method further includes:

encoding the linear effect video frame to generate a linear effect video to be displayed on a display device.

In a possible implementation, after generating the linear effect video frame, the method further includes:

processing the linear effect video frame to generate corresponding non-linear effect video frame; and encoding the non-linear effect video frame to generate a non-linear effect video storage.

In a second aspect, embodiments of the present disclosure provide a video processing apparatus, including:

a decoding module, configured to decode a non-linear video to acquire a corresponding non-linear video frame;

a first processing module, configured to process the non-linear video frame to generate a corresponding linear video frame;

an acquisition module, configured to acquire a target linear effect resource having a color space consistent with a color space adopted by the linear video frame; and a fusion module, configured to fuse the linear video frame and the target linear effect resource to generate a linear effect video frame.

In a third aspect, the present disclosure provides a computer-readable storage medium, wherein instructions are stored in the computer-readable storage medium, and the instructions, when executed on a terminal device, cause the terminal device to implement the above-mentioned method.

In a fourth aspect, the present disclosure provides an electronic device, including:

a processor;

a memory, configured to store executable instructions of the processor;

wherein the processor is configured to read the executable instructions from the memory and execute the instructions to implement the above-mentioned method.

In a fifth aspect, the present disclosure provides a computer program product, including computer programs/instructions, wherein the computer programs/instructions, when executed by a processor, implement the above-mentioned method.

BRIEF DESCRIPTION OF DRAWINGS

The above and other features, advantages, and aspects of embodiments of the present disclosure will become more apparent in conjunction with the accompanying drawings and with reference to the following specific embodiments. Throughout the drawings, the same or similar reference numbers refer to the same or similar elements. It should be understood that the drawings are schematic, and that components and elements are not necessarily drawn to scale.

FIG. 1 is a flow diagram of a video processing method provided by an embodiment of the present disclosure;

FIG. 2*a* is a schematic diagram of a linear space from black to white provided by an embodiment of the present disclosure;

FIG. 2*b* is a schematic diagram of a non-linear space from black to white provided by an embodiment of the present disclosure;

DETAILED DESCRIPTION

Figure 2C:
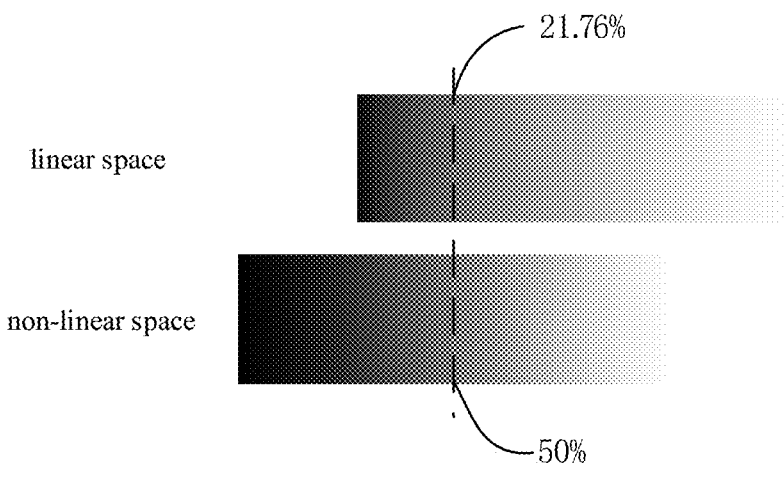
FIG. 2*c* is a schematic diagram of comparison between a linear space and a non-linear space provided by an embodiment of the present disclosure.

Embodiments of the present disclosure will be described in more detail below with reference to the drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

Embodiments of the present disclosure will be described in more detail below with reference to the drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit these devices, modules or units to be different devices, modules or units, nor to limit the interdependence relationship or the order of functions performed by these devices, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "one or more."

Names of messages or information exchanged between a plurality of apparatuses in the embodiments of the present disclosure are only used for illustrative purposes and are not intended to limit the scope of these messages or information.

In order to solve the above problems, embodiments of the present disclosure provide a video processing method, which will be introduced in the following with specific embodiments.

FIG. 1 is a flow diagram of a video processing method provided by an embodiment of the present disclosure. The method may be executed by a video processing apparatus, and the apparatus may be implemented by software and/or hardware and may be generally integrated in an electronic device. As shown in FIG. 1, the method includes the following steps.

Step 101: decoding a non-linear video to acquire a corresponding non-linear video frame.

Generally speaking, a video shot with a mobile phone is a non-linear video and a video exported after editing is a non-linear video. In some embodiments of the present disclosure, there are many video formats of non-linear videos, which are exemplified as follows: a non-linear high dynamic range imaging (HDR) video in the video format of HDR, or a non-linear standard dynamic range (SDR) video in the video format of SDR.

In this embodiment, the non-linear video refers to a video obtained after converting a linear space of a video into a non-linear space. In the linear space, a relationship between a corresponding value of a pixel point and the luminous power of the pixel point is linear, as shown in FIG. 2*a*, which is a schematic diagram of a linear space from black to white provided by an embodiment of the present disclosure. Since human eyes are more sensitive to dark colors, the human eyes see more bright region than dark region in FIG. 2*a*. Furthermore, in order to balance the region area of the bright region and the region area of the dark region, and make the region area of the bright region seen by the human eyes similar to the region area of the dark region seen by the human eyes, non-linear processing may be performed on the linear space. In the non-linear space, a relationship between a corresponding value of a pixel point and the luminous power of the pixel point is non-linear, as shown in FIG. 2*b*, which is a schematic diagram of a non-linear space from black to white provided by an embodiment of the present disclosure. Compared with FIG. 2a, the human eyes see more dark region and less bright region, so that the region areas of the bright region and the dark region seen by the human eyes are similar.

In one possible implementation, the non-linear space is a gamma space, and a corresponding gamma value is 2.2. To explain the relationship between the linear space and the non-linear space more clearly, reference is made to FIG. 2c. In FIG. 2c, a dotted line represents a boundary between the dark region and the bright region seen by human eyes, a value corresponding to this boundary is 21.76% in the linear space, and a value corresponding to this boundary is 50% in the non-linear space. It can be seen that except for the color with the value of 0 or 100%, the values corresponding to the same human visual colors in the linear space and in the non-linear space are different; similarly, the human visual colors corresponding to the same values in the linear space and in the non-linear space may also be different.

It can be seen that the video subjected to non-linear processing can better balance the proportions of bright color and dark color, so as to conform to the visual perception of human eyes. It is readily comprehensible that video frames in a non-linear video are also non-linear. The video can be decoded into corresponding frames by decoding. In the embodiment, in order to perform effect processing on the non-linear video, it is necessary to decode the non-linear video to acquire a corresponding non-linear video frame. There are various decoding methods, which can be selected according to the application scenes, and which are not limited by this embodiment, for example, soft decoding, hard decoding. For example, a non-linear HDR video is decoded to acquire a corresponding non-linear HDR video frame; or a non-linear SDR video is decoded to acquire a corresponding non-linear SDR video frame.

Step 102: processing the non-linear video frame to generate a corresponding linear video frame.

In order to satisfy the needs of video effect processing, such as lighting effects, face buffing and other computer processing, it is necessary to perform effect processing on a video frame in the linear space. Therefore, it is necessary to process the non-linear video frame to generate the corresponding linear video frame.

Figure 3:
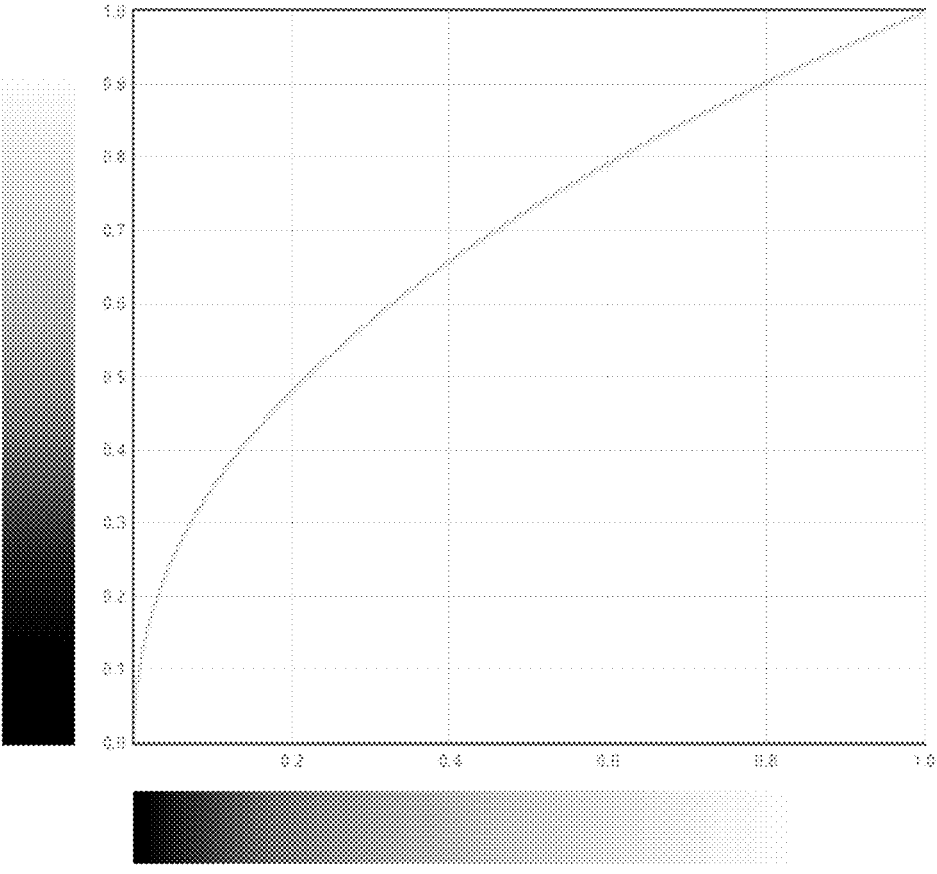
FIG. 3 is a schematic diagram of a corresponding relationship between a linear space and a non-linear space provided by an embodiment of the present disclosure.

In some embodiments of the present disclosure, according to the needs of application scenes, non-linear video frames in different video formats are processed by different conversion functions to generate corresponding linear video frames. For example, in some embodiments of the present disclosure, it is necessary to first determine the video format of the non-linear video frame to be processed, and then invoke a conversion function corresponding to the video format to convert the non-linear video frame to generate corresponding linear video frame. It is noted that the conversion functions corresponding to different video formats may be preset according to the application scenes of video processing. For example, a non-linear HDR video frame is converted into a linear HDR video frame by an HDR conversion function corresponding to an HDR video format, or a non-linear SDR video frame is converted into a linear SDR video frame by an SDR conversion function corresponding to an SDR video format. In order to explain a linear conversion process of the non-linear video frame more clearly, the SDR non-linear video frame is exemplified as follows. As shown in FIG. 3, the abscissa is a color schematic diagram of a linear video frame from black to white, the ordinate is a color schematic diagram of an SDR non-linear video frame from black to white, a curve in FIG. 3 shows the corresponding relationship, for conversion, between the color of the linear video frame and the color of the SDR non-linear video frame. According to the relationship, the SDR non-linear video frame can be converted into the SDR linear video frame.

Step 103: acquiring a target linear effect resource having a color space consistent with a color space adopted by the linear video frame.

Figure 4:
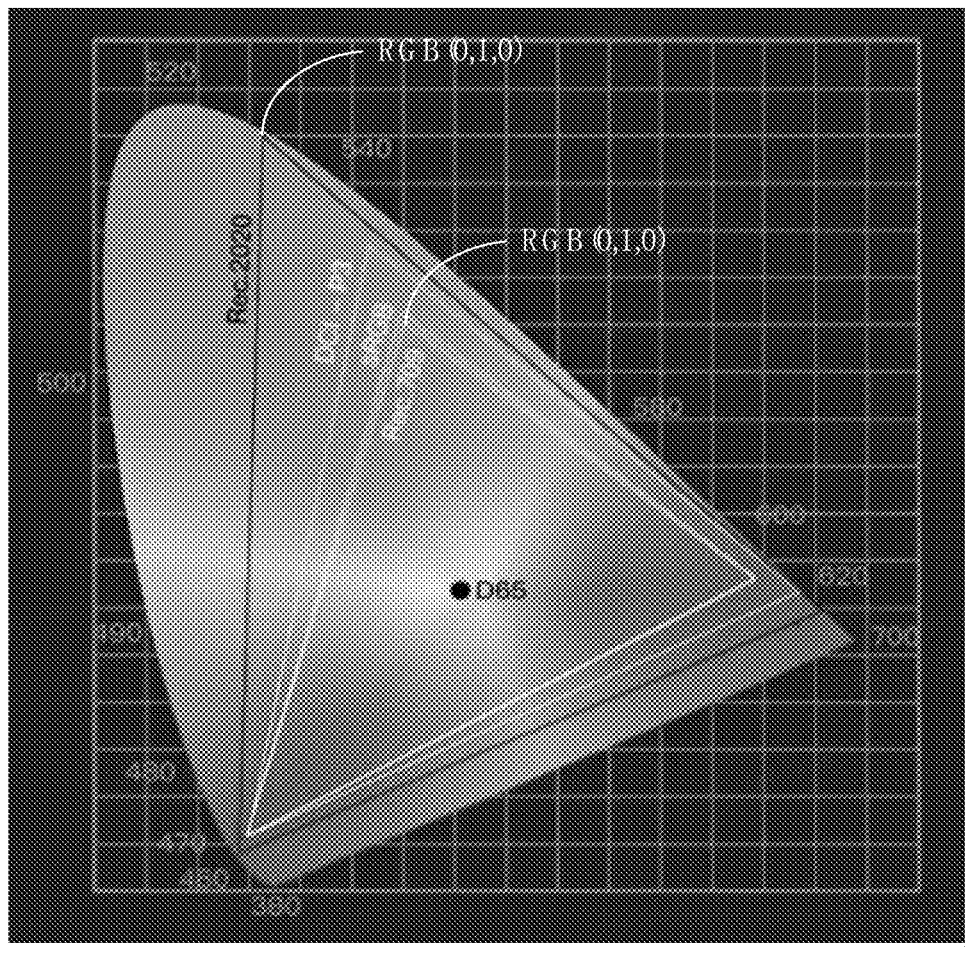
FIG. 4 is a schematic diagram of a three-dimensional color space provided by an embodiment of the present disclosure.

In the embodiment, the color space is a model for representing colors, and the ranges of colors that can be represented by different color spaces are different; by taking a color space with three dimensions as an example, as shown in FIG. 4, which is a schematic diagram of a three-dimensional color space provided by an embodiment of the present disclosure, color regions covered by triangles corresponding to different color spaces in the schematic diagram represent the color ranges that can be represented by the color spaces; and as can be seen from the figure, the color range that can be represented by recommendation ITU-R-BT.2020 (Rec.2020) is larger than that represented by the standard red green blue (sRGB).

It is noted that colors represented by the same value in different color spaces may be different; and by taking the three-dimensional color space as an example, three-dimensional coordinates can be used to represent colors, a value of each dimensional coordinate is 0-1, where 0 means that the color is not taken, and 1 means that the color is taken to the greatest extent in this color space. With reference to FIG. 4, an upper vertex of the triangle corresponding to Rec.2020, which is a point representing a green primary color in Rec.2020, is represented by (0,1,0), and an upper vertex of the triangle corresponding to sRGB, which is a point representing a green primary color in Rec.709, is also represented by (0,1,0). As can be seen from FIG. 4, although both the green primary color in Rec.2020 and the green primary color in sRGB are represented by (0,1,0), the green primary color in Rec.2020 and the green primary color in Rec.709 actually represent different colors.

Therefore, in order to ensure the color accuracy and good quality of the video frame after effect processing, it needs to ensure, before effect processing, that the acquired target linear effect resource has a color space consistent with the color space adopted by the linear video frame to be processed, and then effect processing is performed on the linear video frame according to the target linear effect resource. However, in an actual scene application, the effect resource to be processed may be linear or non-linear, and the color space adopted by the effect resource to be processed may be consistent or inconsistent with the color space adopted by the linear video frame. Therefore, in order to acquire the target linear effect resource having the color space consistent with the color space adopted by the linear video frame to be processed, the non-linear effect resource may be linearly processed into a linear effect resource, and the color space corresponding to the linear effect resource is determined to be consistent with the color space corresponding to the linear video frame to be processed. The non-linear effect resource is specifically described as follows.

In one embodiment, whether a color space adopted by the non-linear effect resource to be processed is consistent with a color space adopted by the linear video frame is detected, and if the color spaces are consistent, the non-linear effect resource is processed to generate the corresponding target linear effect resource. For example, it is assumed that the linear video frame to be processed is linear SDR video frame adopting an sRGB color space, and if it is detected that the non-linear effect resource is a map in the non-linear SDR format adopting the sRGB color space, it is determined that the spaces adopted by the linear SDR video frame and by the map in the non-linear SDR format are consistent. Then, according to the SDR conversion function, linear processing is performed on the map in the non-linear SDR format to generate a corresponding map in the linear SDR format, and effect processing is performed on the linear SDR video frame in the linear space according to the map in the linear SDR format.

In another embodiment, based on the previous embodiment, if it is detected that the color space adopted by the non-linear effect resource is inconsistent with the color space adopted by the linear video frame, the non-linear effect resource is processed to generate a corresponding initial linear effect resource. For example, it is assumed that the linear video frame to be processed is linear HDR video frame adopting a Rec.2020 color space, and if it is detected that the non-linear effect resource is a map in the non-linear SDR format adopting the sRGB color space, it is determined that the color spaces by the linear HDR video frame and by the map in the non-linear SDR format are inconsistent. Then, according to the SDR conversion function, linear processing is performed on the map in the non-linear SDR format to generate a corresponding map in the linear SDR format, and then the map in the linear SDR format is converted into a map in the linear HDR format according to the color space conversion relationship, so that effect processing is performed on the linear HDR video frame in the unified color space in the linear space according to the map in the linear HDR format.

It is noted that if the effect resource to be processed is linear, it is necessary to detect whether the color space adopted by the effect resource to be processed is consistent with the color space adopted by the linear video frame, and if the color spaces are consistent, the linear effect resource is the target linear effect resource; for example, it is assumed that the linear video frame to be processed is linear HDR video frame adopting a Rec.2020 color space, and if it is detected that the linear effect resource is a map in the linear HDR format adopting the Rec.2020 color space, the linear resource may be applied to effect processing on the linear video frame.

Further, if it is detected that the color space adopted by the linear effect resource to be processed is inconsistent with the color space adopted by the linear video frame, color space conversion is performed on the linear effect resource to be processed to generate the target linear effect resource; for example, it is assumed that the linear video frame to be processed is linear HDR video frame adopting the Rec.2020 color space, and if it is detected that the linear effect resource is a map in the linear SDR format adopting the sRGB color space, it is determined that the color space adopted by the linear HDR video frame is inconsistent with the color space adopted by map in the linear SDR format. Then, the map in the linear SDR format is converted into the map in the linear HDR format according to the color space conversion relationship, so that effect processing is performed on the linear HDR video frame in the unified color space in the linear space according to the map in the linear HDR format.

Step 104: fusing the linear video frame and the target linear effect resource to generate a linear effect video frame.

After determining the target linear effect resource having a color space that is consistent with a color space adopted by the linear video frame and is linear, the linear video frame and the target linear effect resource are fused, the target linear effect resource is applied to the linear video frame by fusing, and according to effect application requirements, a virtual sticker is added to the linear video frame and/or the linear video frame is blurred, so that the linear effect video frame is generated. Detailed description is as follows.

Figure 5A:
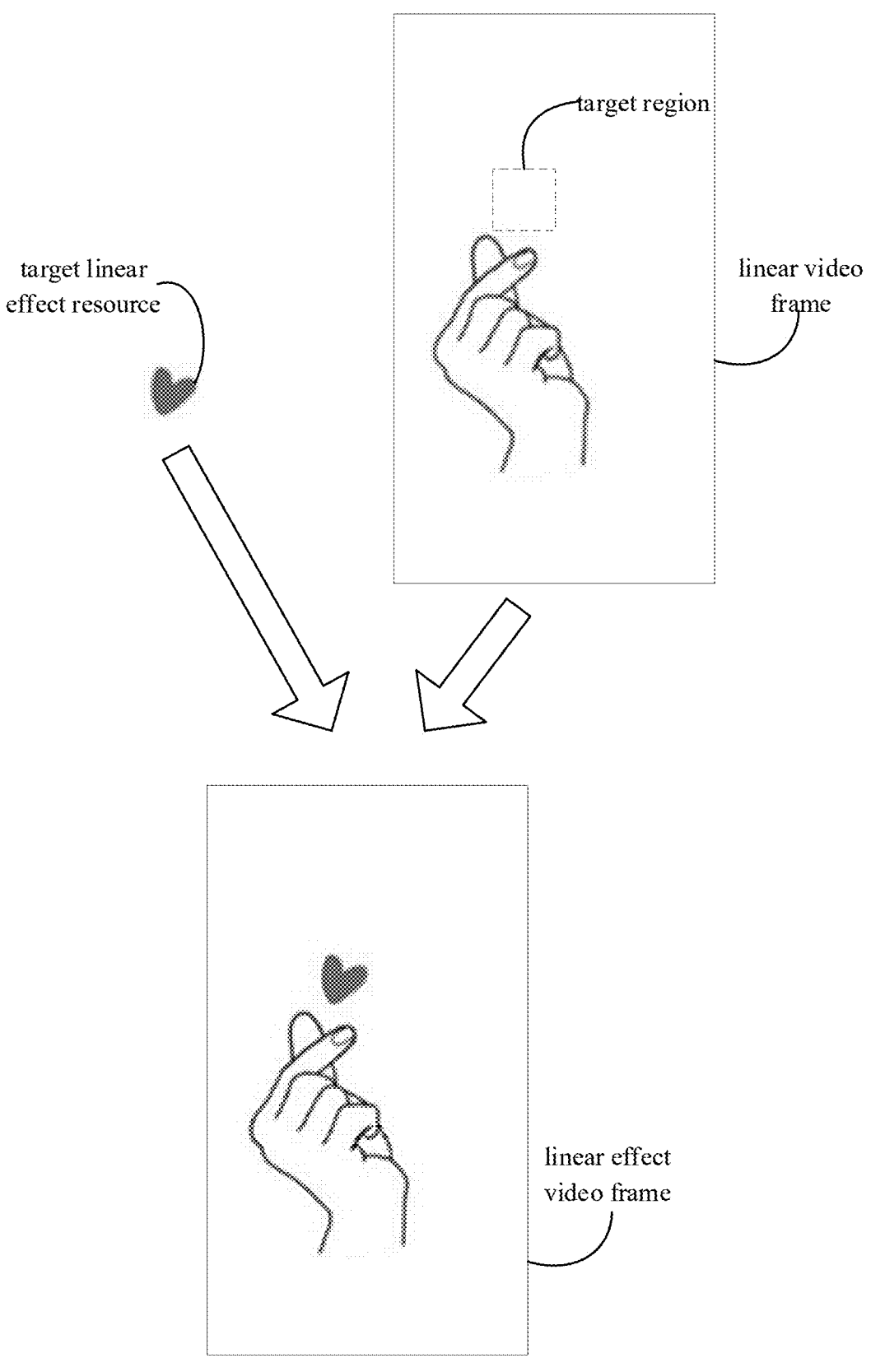
FIG. 5*a* is a schematic diagram for generating a linear feature video frame provided by an embodiment of the present disclosure.

In one embodiment, as shown in FIG. 5*a*, the target linear effect resource having the color space consistent with the color space adopted by the linear video frame is acquired after the processing in the above steps, where the target linear effect resource is a heart-shaped picture, the linear video frame is a finger heart gesture, the target region is a region above an intersection of an index finger and a thumb in the finger heart gesture, the heart-shaped picture and the target region of the finger heart gesture are overlaid, and when pixels of the linear video frame coincide with the pixels of the target linear effect resource, the pixels of the target linear effect resource are reserved, so that the overlaying in the target region is realized, and a linear feature video frame as shown in FIG. 5*a* can be generated; and in this linear feature video frame, a new sticker effect is generated above the intersection of the index finger and the thumb in the finger heart gesture.

Figure 5B:
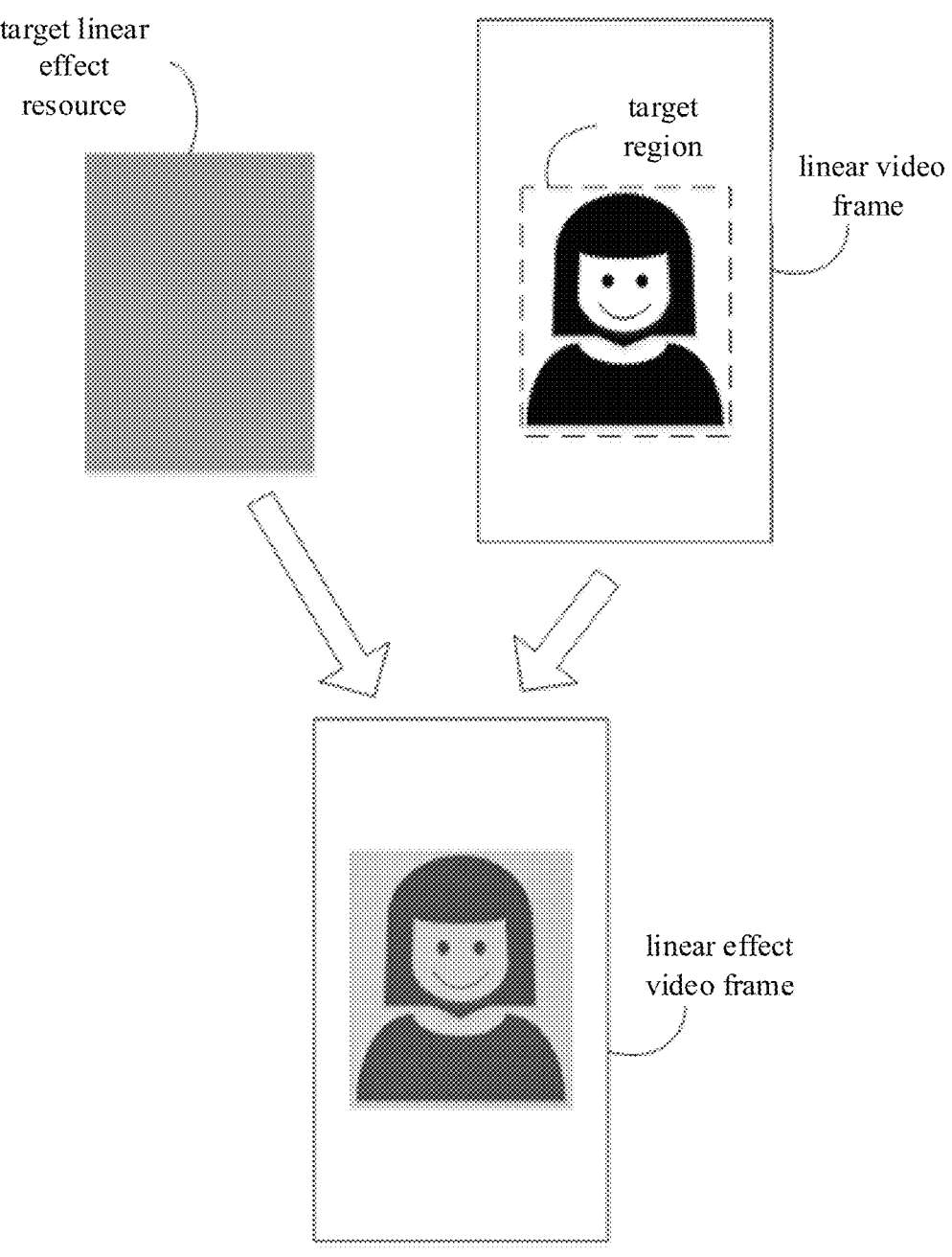
FIG. 5*b* is another schematic diagram for generating a linear feature video frame provided by an embodiment of the present disclosure.

In another embodiment, as shown in FIG. 5*b*, the target linear effect resource having the color space consistent with the color space adopted by the linear video frame is acquired after the processing in the above steps, where the description is given by taking the target linear effect resource being a brown picture and the linear video frame being a portrait as an example, the target region is a rectangular region containing the portrait, the brown picture and a target region of the portrait are calculated, when pixels of the linear video frame in the target region coincide with the pixels of the target linear effect resource, an average value of each overlaid pixel from the linear video frame and the target linear effect resource is taken respectively, so as to implement the calculation processing in the target region; and a linear effect video frame as shown in FIG. 5*b* can be generated, in which a portrait region is blurred.

To sum up, according to the video processing method of the embodiment of the present disclosure, the non-linear video frame is processed to generate the corresponding linear video frame, and the effect resource for effects processing is also linear, such that the linear video frame and the target linear effect resource are fused in a linear space, so that the color accuracy of the generated linear effect video frame is ensured, the added effect resource is more natural and the realism of the generated linear effect video frame is improved.

Based on the above embodiments, further, after generating the linear effect video frame, the video processing method further includes: encoding the linear effect video frame to generate a linear effect video to be displayed on a display device.

In order to acquire the linear effect video, the linear effect video frame is encoded to generate the linear effect video. Where, the linear effect video frame can be synthesized into a corresponding linear effect video by encoding. There are various encoding modes, which can be selected according to the application scenes, and which are not limited by this embodiment, for example, soft coding, hard coding. Therefore, through the linear processing, color space conversion and other technical means described above, the color accuracy of the effect video displayed on the display device is enhanced, and the effects are more realistic.

Based on the above embodiments, further, after generating the linear effect video frame, in another possible implementation, it is necessary to store the processed video in a storage medium. Generally, the video stored in the storage medium is a non-linear video, therefore, based on the above embodiments, the video processing method further includes:

processing the linear effect video frame to generate corresponding non-linear effect video frame. Where, this processing can be used to convert the linear video frame into the non-linear video frame. There are various processing methods, which can be selected according to application scenes, and which are not limited by this embodiment. For example, the processing method is using a transfer function for processing, and in one possible implementation, the processing method is using an opo-electronic transfer function (OETF) for processing.

Further, the non-linear effect video frame is encoded to generate a non-linear effect video storage. Where, the non-linear video frame can be synthesized into a corresponding non-linear video by encoding. There are various encoding modes, which can be selected according to the application scenes, and which are not limited by this embodiment, for example, soft coding, hard coding. Therefore, this coding method can be used to process non-linear effect video frame to generate a corresponding non-linear effect video, and the corresponding non-linear effect video is stored in a storage device. Accordingly, the storage of the effect video is realized, and the effect video can be acquired from the storage device if needed in the future, so that the acquisition of the effect video is more convenient and faster.

Figures 6, 7:
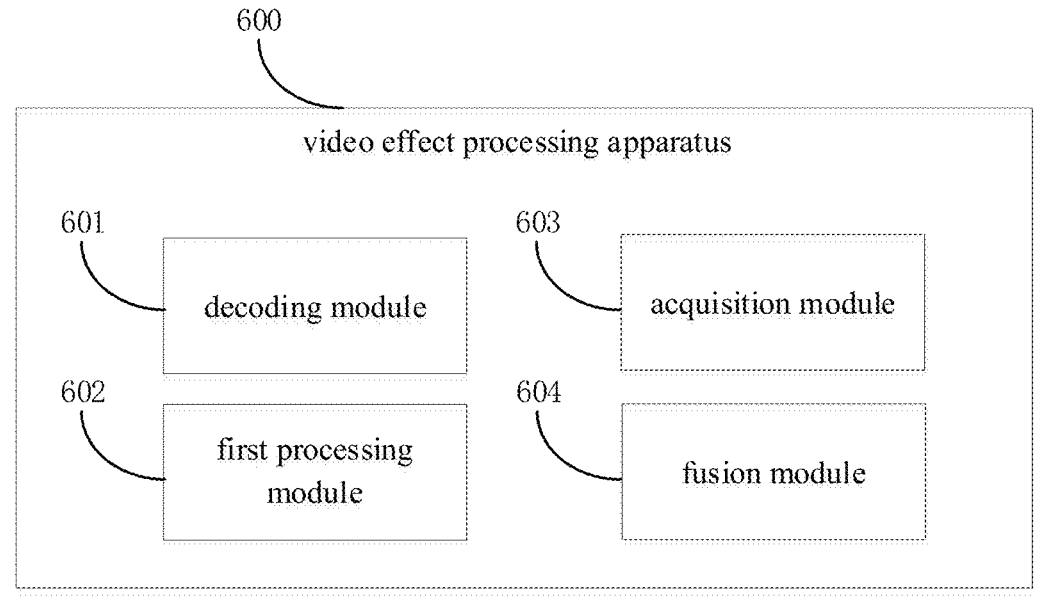
FIG. 6 is a schematic structural diagram of a video processing apparatus provided by an embodiment of the present disclosure.
FIG. 7 is a schematic structural diagram of an electronic device provided by an embodiment of the present disclosure.

FIG. 6 is a schematic structural diagram of a video processing apparatus provided by an embodiment of the present disclosure. The apparatus may be implemented by software and/or hardware and may be generally integrated in an electronic device. As shown in FIG. 6, the apparatus 600 includes:

a decoding module 601 configured to decode a non-linear video to acquire a corresponding non-linear video frame;

a first processing module 602 configured to process the non-linear video frame to generate a corresponding linear video frame;

an acquisition module 603 configured to acquire a target linear effect resource having a color space consistent with a color space adopted by the linear video frame; and a fusion module 604 configured to fuse the linear video frame and the target linear effect resource to generate a linear effect video frame.

In one possible implementation, the decoding module 601 is configured to:

decode a non-linear HDR video to acquire a corresponding non-linear HDR video frame;

or, decode a non-linear SDR video to acquire a corresponding non-linear SDR video frame.

In one possible implementation, the first processing module 602 is configured to:

acquire a video format of the non-linear video frame; and invoke a conversion function corresponding to the video format to convert the non-linear video frame to generate the corresponding linear video frame.

In one possible implementation, the acquisition module 603 is configured to:

detect whether a color space of a non-linear effect resource is consistent with the color space adopted by the linear video frame; and in response to consistency, process the non-linear effect resource to generate the corresponding target linear effect resource.

In one possible implementation, the acquisition module 603 is further configured to:

in response to inconsistency, process the non-linear effect resource to generate a corresponding initial linear effect resource; and convert the initial linear effect resource into the target linear effect resource having the color space consistent with the color space adopted by the linear video frame according to a preset color space conversion function.

In one possible implementation, the fusion module 604 is configured to:

overlay the target linear effect resource with a target region of the linear video frame to generate the linear effect video frame; and/or, calculate the target linear effect resource and pixels of the target region of the linear video frame to generate the linear effect video frame.

In one possible implementation, the apparatus 600 further includes:

a first encoding module configured to encode the linear effect video frame to generate a linear effect video to be displayed on a display device.

In one possible implementation, the apparatus 600 further includes:

a second processing module configured to process the linear effect video frame to generate corresponding non-linear effect video frame; and a second encoding module configured to encode the non-linear effect video frame to generate a non-linear effect video storage.

The video processing apparatus provided by the embodiment of the present disclosure can execute the video processing method provided by any embodiment of the present disclosure and has corresponding functional modules for executing the method and beneficial effects.

An embodiment of the present disclosure also provides a computer program product, including computer programs/instructions which, when executed by a processor, implement the video processing method provided by any embodiment of the present disclosure.

FIG. 7 is a schematic structural diagram of an electronic device provided by an embodiment of the present disclosure.

Referring to FIG. 7, FIG. 7 illustrates a schematic structural diagram of an electronic device 700 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, a smart home device or the like. The electronic device illustrated in FIG. 7 is merely an example, and should not pose any limitation to the functions and the range of use of the embodiments of the present disclosure.

As illustrated in FIG. 7, the electronic device 700 may include a processing apparatus 701 (e.g., a central processing unit, a graphics processing unit, etc.), which can perform various suitable actions and processing according to a program stored in a read-only memory (ROM) 702 or a program loaded from a storage apparatus 708 into a random-access memory (RAM) 703. The RAM 703 further stores various programs and data required for operations of the electronic device 700. The processing apparatus 701, the ROM 702, and the RAM 703 are interconnected by means of a bus 704. An input/output (I/O) interface 705 is also connected to the bus 704.

Usually, the following apparatus may be connected to the I/O interface 705: an input apparatus 706 including, for example, a touch screen, a touch pad, a keyboard, a mouse, a camera, a microphone, an accelerometer, a gyroscope, or the like; an output apparatus 707 including, for example, a liquid crystal display (LCD), a loudspeaker, a vibrator, or the like; a storage apparatus 708 including, for example, a magnetic tape, a hard disk, or the like; and a communication apparatus 709. The communication apparatus 709 may allow the electronic device 700 to be in wireless or wired communication with other devices to exchange data. While FIG. 7 illustrates the electronic device 700 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 709 and installed, or may be installed from the storage apparatus 708, or may be installed from the ROM 702. When the computer program is executed by the processing apparatus 701, the above-mentioned functions defined in the video processing method of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable program-mable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus, or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate, or transmit a program used by or in combination with an instruction execution system, apparatus, or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: decode a non-linear video to acquire a corresponding non-linear video frame; process the non-linear video frame to generate a corresponding linear video frame; acquire a target linear effect resource having a color space consistent with a color space adopted by the linear video frame; and fuse the linear video frame and the target linear effect resource to generate a linear effect video frame. According to the embodiments of the present disclosure, the non-linear video frame is processed to generate the corresponding linear video frame, and the effect resource for effects processing is also linear, such that the linear video frame and the target linear effect resource are fused in a linear space, so that the color accuracy of the generated linear effect video frame is ensured, the added effect resource is more natural and the realism of the generated linear effect video frame is improved.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus, or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, the present disclosure provides a video processing method, including:

decoding a non-linear video to acquire a corresponding non-linear video frame;

processing the non-linear video frame to generate a corresponding linear video frame;

acquiring a target linear effect resource having a color space consistent with a color space adopted by the linear video frame; and fusing the linear video frame and the target linear effect resource to generate a linear effect video frame.

According to one or more embodiments of the present disclosure, in the video processing method provided by the present disclosure, the decoding the non-linear video to acquire the corresponding non-linear video frame includes:

decoding a non-linear HDR video to acquire a corresponding non-linear HDR video frame;

or, decoding a non-linear SDR video to acquire a corresponding non-linear SDR video frame.

According to one or more embodiments of the present disclosure, in the video processing method provided by the present disclosure, the processing the non-linear video frame to generate the corresponding linear video frame includes:

acquiring a video format of the non-linear video frame; and invoking a conversion function corresponding to the video format to convert the non-linear video frame to generate the corresponding linear video frame.

According to one or more embodiments of the present disclosure, in the video processing method provided by the present disclosure, the acquiring the target linear effect resource having the color space consistent with the color space adopted by the linear video frame includes:

detecting whether a color space of a non-linear effect resource is consistent with the color space adopted by the linear video frame; and in response to consistency, processing the non-linear effect resource to generate the corresponding target linear effect resource.

According to one or more embodiments of the present disclosure, in the video processing method provided by the present disclosure, the method further including:

in response to inconsistency, processing the non-linear effect resource to generate a corresponding initial linear effect resource; and converting the initial linear effect resource into the target linear effect resource having the color space consistent with the color space adopted by the linear video frame according to a preset color space conversion function.

According to one or more embodiments of the present disclosure, in the video processing method provided by the present disclosure, the fusing the linear video frame and the target linear effect resource to generate the linear effect video frame includes at least one of:

overlaying the target linear effect resource with a target region of the linear video frame to generate the linear effect video frame;

calculating the target linear effect resource and pixels of the target region of the linear video frame to generate the linear effect video frame.

According to one or more embodiments of the present disclosure, in the video processing method provided by the present disclosure, after generating the linear effect video frame, the method further includes:

encoding the linear effect video frame to generate a linear effect video to be displayed on a display device.

According to one or more embodiments of the present disclosure, in the video processing method provided by the present disclosure, after generating the linear effect video frame, the method further includes:

processing the linear effect video frame to generate corresponding non-linear effect video frame; and encoding the non-linear effect video frame to generate a non-linear effect video storage.

According to one or more embodiments of the present disclosure, the present disclosure provides a video processing apparatus, including:

a decoding module, configured to decode a non-linear video to acquire a corresponding non-linear video frame;

a first processing module, configured to process the non-linear video frame to generate a corresponding linear video frame;

an acquisition module, configured to acquire a target linear effect resource having a color space consistent with a color space adopted by the linear video frame; and a fusion module, configured to fuse the linear video frame and the target linear effect resource to generate a linear effect video frame.

According to one or more embodiments of the present disclosure, in the video processing apparatus provided by the present disclosure, the decoding module is configured to:

decode a non-linear HDR video to acquire a corresponding non-linear HDR video frame;

or, decode a non-linear SDR video to acquire a corresponding non-linear SDR video frame.

According to one or more embodiments of the present disclosure, in the video processing apparatus provided by the present disclosure, the first processing module is configured to:

acquire a video format of the non-linear video frame; and invoke a conversion function corresponding to the video format to convert the non-linear video frame to generate the corresponding linear video frame.

According to one or more embodiments of the present disclosure, in the video processing apparatus provided by the present disclosure, the acquisition module is configured to:

detect whether a color space of a non-linear effect resource is consistent with the color space adopted by the linear video frame; and in response to consistency, process the non-linear effect resource to generate the corresponding target linear effect resource.

According to one or more embodiments of the present disclosure, in the video processing apparatus provided by the present disclosure, the acquisition module is further configured to:

in response to inconsistency, process the non-linear effect resource to generate a corresponding initial linear effect resource; and convert the initial linear effect resource into the target linear effect resource having the color space consistent with the color space adopted by the linear video frame according to a preset color space conversion function.

According to one or more embodiments of the present disclosure, in the video processing apparatus provided by the present disclosure, the fusion module is configured to:

overlay the target linear effect resource with a target region of the linear video frame to generate the linear effect video frame; and/or, calculate the target linear effect resource and pixels of the target region of the linear video frame to generate the linear effect video frame.

According to one or more embodiments of the present disclosure, in the video processing apparatus provided by the present disclosure, the apparatus further includes:

an encoding module, configured to encode the linear effect video frame to generate a linear effect video to be displayed on a display device.

According to one or more embodiments of the present disclosure, in the video processing apparatus provided by the present disclosure, the apparatus further includes:

a second processing module, configured to process the linear effect video frame to generate corresponding non-linear effect video frame; and a second encoding module, configured to encode the non-linear effect video frame to generate a non-linear effect video storage.

According to one or more embodiments of the present disclosure, the present disclosure provides an electronic device, including:

a processor;

a memory, configured to store executable instructions of the processor;

wherein the processor is configured to read the executable instructions from the memory and execute the instructions to implement the video processing method provided by any one of the present disclosures.

According to one or more embodiments of the present disclosure, the present disclosure provides a computer-readable storage medium, wherein computer programs are stored in the computer-readable storage medium, and the computer programs are used to implement the video processing method provided by any one of the present disclosures.

The above descriptions are merely preferred embodiments of the present disclosure and illustrations of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims.

The invention claimed is:

1. A method for generating video effects, comprising:

decoding a non-linear video to acquire a corresponding non-linear video frame;

processing the non-linear video frame to generate a corresponding linear video frame;

acquiring an effect resource for generating a new effect in the linear video frame;

detecting that the effect resource is a linear effect resource;

detecting whether a color space adopted by the effect resource is consistent with a color space adopted by the linear video frame;

generate a target linear effect resource by performing color space conversion on the effect resource in response to detecting that the color space adopted by the effect resource is not consistent with the color space adopted by the linear video frame; and generating the new effect in the linear video frame by fusing the linear video frame and the target linear effect resource to obtain a linear effect video frame.

2. The method according to claim 1, wherein the decoding the non-linear video to acquire the corresponding non-linear video frame comprises:

decoding a non-linear high dynamic range imaging (HDR) video to acquire a corresponding non-linear HDR video frame;

or, decoding a non-linear standard dynamic range (SDR) video to acquire a corresponding non-linear SDR video frame.

3. The method according to claim 1, wherein the processing the non-linear video frame to generate the corresponding linear video frame comprises:

acquiring a video format of the non-linear video frame; and invoking a conversion function corresponding to the video format to convert the non-linear video frame to generate the corresponding linear video frame.

4. The method according to claim 1, wherein further comprising:

detecting whether a color space of a non-linear effect resource is consistent with the color space adopted by the linear video frame; and in response to consistency, processing the non-linear effect resource to generate the target linear effect resource which is corresponding to the non-linear effect resource.

5. The method according to claim 4, further comprising:

in a case of inconsistency, processing the non-linear effect resource to generate a corresponding initial linear effect resource; and converting the initial linear effect resource into the target linear effect resource having the color space consistent with the color space adopted by the linear video frame according to a preset color space conversion function.

6. The method according to claim 1, wherein the generating the new effect in the linear video frame by fusing the linear video frame and the target linear effect resource obtain a linear effect video frame comprises at least one of:

overlaying the target linear effect resource with a target region of the linear video frame to generate the linear effect video frame;

calculating the target linear effect resource and pixels of the target region of the linear video frame to generate the linear effect video frame.

7. The method according to claim 1, wherein, after obtaining the linear effect video frame, the method further comprises:

encoding the linear effect video frame to generate a linear effect video to be displayed on a display device.

8. The method according to claim 1, wherein, after obtaining the linear effect video frame, the method further comprises:

processing the linear effect video frame to generate corresponding non-linear effect video frame; and encoding the non-linear effect video frame to generate a non-linear effect video storage.

9. An electronic device, comprising:

a processor;

a memory, configured to store executable instructions of the processor;

wherein the processor is configured to read the executable instructions from the memory and execute the executable instructions to implement operations comprising:

decoding a non-linear video to acquire a corresponding non-linear video frame;

processing the non-linear video frame to generate a corresponding linear video frame;

acquiring an effect resource for generating a new effect in the linear video frame;

detecting that the effect resource is a linear effect resource;

detecting whether a color space adopted by the effect resource is consistent with a color space adopted by the linear video frame;

generate a target linear effect resource by performing color space conversion on the effect resource in response to detecting that the color space adopted by the effect resource is not consistent with the color space adopted by the linear video frame; and generating the new effect in the linear video frame by fusing the linear video frame and the target linear effect resource obtain a linear effect video frame.

10. The electronic device according to claim 9, wherein the decoding the non-linear video to acquire the corresponding non-linear video frame comprises:

decoding a non-linear high dynamic range imaging (HDR) video to acquire a corresponding non-linear HDR video frame;

or, decoding a non-linear standard dynamic range (SDR) video to acquire a corresponding non-linear SDR video frame.

11. The electronic device according to claim 9, wherein the processing the non-linear video frame to generate the corresponding linear video frame comprises:

acquiring a video format of the non-linear video frame; and invoking a conversion function corresponding to the video format to convert the non-linear video frame to generate the corresponding linear video frame.

12. The electronic device according to claim 9, wherein the operations further comprising:

detecting whether a color space of a non-linear effect resource is consistent with the color space adopted by the linear video frame; and in response to consistency, processing the non-linear effect resource to generate the target linear effect resource which is corresponding to the non-linear effect resource.

13. The electronic device according to claim 12, wherein the operations further comprise:

in a case of inconsistency, processing the non-linear effect resource to generate a corresponding initial linear effect resource; and converting the initial linear effect resource into the target linear effect resource having the color space consistent with the color space adopted by the linear video frame according to a preset color space conversion function.

14. The electronic device according to claim 9, wherein the generating the new effect in the linear video frame by fusing the linear video frame and the target linear effect resource obtain a linear effect video frame comprises at least one of:

overlaying the target linear effect resource with a target region of the linear video frame to generate the linear effect video frame;

calculating the target linear effect resource and pixels of the target region of the linear video frame to generate the linear effect video frame.

15. The electronic device according to claim 9, wherein, after obtaining the linear effect video frame, the operations further comprise:

encoding the linear effect video frame to generate a linear effect video to be displayed on a display device.

16. The electronic device according to claim 9, wherein, after obtaining the linear effect video frame, the operations further comprise:

processing the linear effect video frame to generate corresponding non-linear effect video frame; and encoding the non-linear effect video frame to generate a non-linear effect video storage.

17. A non-transitory computer-readable storage medium, wherein instructions are stored in the computer-readable storage medium, and the instructions, when executed on a terminal device, cause the terminal device to implement operations comprising:

decoding a non-linear video to acquire a corresponding non-linear video frame;

processing the non-linear video frame to generate a corresponding linear video frame;

acquiring an effect resource for generating a new effect in the linear video frame;

detecting that the effect resource is a linear effect resource;

detecting whether a color space adopted by the effect resource is consistent with a color space adopted by the linear video frame;

generate a target linear effect resource by performing color space conversion on the effect resource in response to detecting that the color space adopted by the effect resource is not consistent with the color space adopted by the linear video frame; and generating the new effect in the linear video frame by fusing the linear video frame and the target linear effect resource obtain a linear effect video frame.

18. The non-transitory computer-readable storage medium according to claim 17, wherein the decoding the non-linear video to acquire the corresponding non-linear video frame comprises:

decoding a non-linear high dynamic range imaging (HDR) video to acquire a corresponding non-linear HDR video frame; or, decoding a non-linear standard dynamic range (SDR) video to acquire a corresponding non-linear SDR video frame.

* * * * *